(12) United States Patent
Peng et al.

(10) Patent No.: US 9,105,404 B2
(45) Date of Patent: Aug. 11, 2015

(54) CHARGE STORAGE DEVICE AND METHOD OF MANUFACTURING IT

(75) Inventors: Chuang Peng, Nottinghamshire (GB); George C. Chen, Nottinghamshire (GB)

(73) Assignee: THE UNIVERSITY OF NOTTINGHAM, Nottingham (GB)

( * ) Notice: Subject to any disclaimer, the term of this patent is extended or adjusted under 35 U.S.C. 154(b) by 0 days.

(21) Appl. No.: 13/816,336

(22) PCT Filed: Oct. 11, 2011

(86) PCT No.: PCT/IB2011/054470
§ 371 (c)(1),
(2), (4) Date: Feb. 11, 2013

(87) PCT Pub. No.: WO2012/020393
PCT Pub. Date: Feb. 16, 2012

(65) Prior Publication Data
US 2013/0141839 A1    Jun. 6, 2013

(30) Foreign Application Priority Data
Aug. 11, 2010    (GB) .................................. 1013484.9

(51) Int. Cl.
*H01G 9/00*     (2006.01)
*H01G 9/04*     (2006.01)
(Continued)

(52) U.S. Cl.
CPC ............... *H01G 9/058* (2013.01); *H01G 11/04* (2013.01); *H01G 11/22* (2013.01); *H01G 11/24* (2013.01);
(Continued)

(58) Field of Classification Search
USPC ......... 361/502, 503–504, 509–512, 523–528, 361/517–518
See application file for complete search history.

(56) References Cited

U.S. PATENT DOCUMENTS 5,538,813 A    7/1996 Li
6,222,723 B1   4/2001 Razoumov et al.
(Continued)

FOREIGN PATENT DOCUMENTS

| EP | 1768141 |   | 3/2007 |
| EP | 1768141 A1 | * | 3/2007 |
| GB | 2443221 |   | 4/2008 |

OTHER PUBLICATIONS

PCT International Search Report and Written Opinion for International Application No. PCT/IB2011/054470 dated Jun. 27, 2012.

*Primary Examiner* — Nguyen T Ha
(74) *Attorney, Agent, or Firm* — Michael Best & Friedrich LLP

(57) ABSTRACT

The present invention provides a charge storage device, comprising a pair of electrodes, each electrode being operable to store electric charge and having a respective capacitance $C_P$, $C_N$ that is different to the other, with the ratio of the capacitances $C_P/C_N$ being greater than 1. In exemplary embodiments, the charge storage device may be an asymmetrical supercapacitor, which is operable to provide an enhanced energy capacity by increasing the cell voltage through unequalising the electrode capacitance. Hence, by increasing the $C_P/C_N$ ratio an improved power capability can be achieved over conventional devices, while offering a simple and low cost manufacturing strategy. The present invention has particular application with cameras, electric vehicles, elevators, renewable energy stores, fuel cells, batteries and many forms of electronic devices.

11 Claims, 3 Drawing Sheets

(51) Int. Cl.
*H01G 11/22* (2013.01)
*H01G 11/24* (2013.01)
*H01G 13/00* (2013.01)
*H01G 11/04* (2013.01)
*H01G 11/36* (2013.01)
*B82Y 99/00* (2011.01)

(52) U.S. Cl.
CPC ............... *H01G 11/36* (2013.01); *H01G 13/00* (2013.01); *B82Y 99/00* (2013.01); *Y02E 60/13* (2013.01); *Y02T 10/7022* (2013.01); *Y10T 29/417* (2015.01)

(56) References Cited

U.S. PATENT DOCUMENTS

| 7,199,997 | B1 | 4/2007 | Lipka et al. |
| 2009/0290287 | A1 | 11/2009 | Lipka et al. |

* cited by examiner

| $\dfrac{C_P}{C_C}$ | $U_{peak}$ V | $E_N$ V | $E_0$ V | $U$ V | $C$ mF | $m$ mg | $E_m$ J g$^{-1}$ | $P_m$ W g$^{-1}$ |
|---|---|---|---|---|---|---|---|---|
| 0.8 | 0.97 | −0.19 | 0.24 | 0.90 | 17.0 | 0.383 | 18.0 | 0.399 |
| 1.0 | 1.15 | −0.37 | 0.21 | 1.05 | 19.8 | 0.404 | 27.0 | 0.515 |
| 1.1 | 1.34 | −0.56 | 0.14 | 1.20 | 19.6 | 0.415 | 34.0 | 0.567 |
| 1.2 | 1.40 | −0.62 | 0.14 | 1.30 | 20.5 | 0.425 | 40.8 | 0.627 |
| 1.3 | 1.47 | −0.69 | 0.14 | 1.40 | 20.7 | 0.435 | 46.6 | 0.666 |
| 1.5 | 1.65 | −0.87 | 0.12 | 1.50 | 20.8 | 0.456 | 51.3 | 0.684 |

** Potentials vs. Ag/AgCl

CHARGE STORAGE DEVICE AND METHOD OF MANUFACTURING IT

RELATED APPLICATIONS

This patent application is a national stage filing under 35 U.S.C. §371 of International Application No. PCT/IB2011/054470, filed on Oct. 11, 2011, which claims priority to Great Britain Patent Application No. 1013484.9, filed on Aug. 11, 2010. Priority to each application is hereby claimed, and the contents of each application are incorporated herein by reference.

The present invention relates to charge storage devices and particularly relates to an improved capacitor and a method of manufacturing such capacitors.

Capacitors are commonly used in electronic and electrical circuits for storing charge and for supplying electrical energy to other components within the circuit. One particular form of capacitor is known as a 'Supercapacitor' (SP).

Supercapacitors (SPs) are capable of boosting power within electronic circuits and are widely used in, for example, cameras, electric vehicles, elevators, renewable energy stores and grid load leveling systems etc. However, a known drawback of conventional SPs is that they generally have a low energy capacity, as compared to cells and batteries etc. and therefore they may not be suitable for particular devices and applications, especially those that have relatively high power demands.

The energy stored in a SP (and indeed, in all capacitors in general), E, is related to its capacitance, C, and voltage, U, by Equation (1).

$$E = CU^2/2 \qquad (1)$$

For 'symmetrical SPs', the positive and negative electrodes have the same working potential range, while in so called 'asymmetrical SPs', the amount of charge, Q, stored in each of the positive and negative electrodes must be the same. This requirement is governed by the following equations:

$$Q = C_P U_P = C_N U_N \text{ or } U_N = U_P C_P / C_N \qquad (2)$$

$$C = \frac{C_P C_N}{C_P + C_N} = \frac{C_P}{1 + C_P/C_N} \qquad (3)$$

$$U = U_P + U_N = U_P(1 + C_P/C_N) \qquad (4)$$

where $C_P$ and $C_N$ are the capacitance, and $U_P$ and $U_N$ are the "working potential range" of the positive and negative electrodes, respectively, in the cell. Note that $U_P$ or $U_N$ is defined as the difference between the more positive (or less negative) and the less positive (or more negative) potential limits of the working potential range. This means that $U_P$ or $U_N$ is always positive, disregarding the electrode's polarity.

Conventionally, a SP's working voltage is limited by any irreversible electrode reactions, such as solvent decomposition and over-oxidation or over-reduction of the electrode materials. Therefore, in practice these set the upper and lower limits of the "exploitable potential range" of the electrode, $U°_P$ or $U°_N$ for the positive or negative electrode, respectively. Thus, it is the case that $U_P \leq U°_P$ and $U_N \leq U°_N$. However, it should be appreciated that along the potential axis, $U_N$ and $U_P$ are next to each other, but $U°_P$ and $U°_N$ may be either connected, or overlapping partially or completely. Hence, referring to Equation (2), it is evident that if $C_P$ increases, $U_P$ must therefore decrease, with the same relationship applying to $C_N$ and $U_N$.

Such a situation is avoided in a symmetrical SP with equalised electrode capacitance (i.e. $C_N = C_P$). However, for an asymmetrical SP, the two electrodes will likely have different values for $U°_P$ and $U°_N$. Thus, according to Equations (2) and (4), when the positive and negative electrodes are equalised in capacitance, the cell voltage will be limited either by the positive electrode if $U°_P < U°_N$, or by the negative electrode if $U°_P > U°_N$. (In cases where $U°_P$ and $U°_N$ overlap, they should be replaced by $U_P$ and $U_N$, respectively). Therefore, it is clear that the energy and power characteristics of the SP are predominantly determined by the operating voltage of the SP, which in turn is limited by the solvent decomposition and over-oxidation/reduction of the electrode materials. As the charge stored in the positive and negative electrodes in an asymmetrical SP must be the same (c.f. Equation (2)), the working potential range ($U_P$ or $U_N$) of one electrode will decrease when its capacitance ($C_P$ or $C_N$) increases, thus inhibiting the irreversible electrode reactions. This therefore places significant limitations on the energy capacity of the SP, which restricts its power boosting and storage performance within an electronic or electrical circuit.

Hence, it is an object of the present invention to address some, if not all of the above problems, by providing an improved capacitor that has an enhanced energy capacity and improved storage performance over conventional asymmetrical SPs, and which also permits a low cost design and fabrication/manufacturing strategy.

According to a first aspect of the present invention there is provided a charge storage device, comprising:
  a pair of electrodes, each electrode being operable to store electric charge and having a respective capacitance $C_P$, $C_N$ that is different to the other, with the ratio of the capacitances $C_P/C_N$ being greater than 1.

The provision of a pair of electrodes having respective capacitances that are different to each other, and such that the ratio of their capacitances is greater than 1 is found to be particularly advantageous as this allows the cell voltage of the device to be extended (or increased), which thereby enhances the energy capacity and power capability of the device.

By "cell voltage" we mean, in particular, the operating voltage of the device or the working potential range of the device.

Therefore, by "unequalising" the capacitances of the electrodes, as a result of increasing the ratio of the electrode capacitances, it has been found that the cell voltage can be markedly increased leading to a greater specific energy capacity for the device.

In particularly preferred embodiments, the charge storage device may be a capacitor, and in exemplary embodiments the charge storage device may be an asymmetric Supercapacitor (SP).

The pair of electrodes are preferably comprised of a positive electrode and a negative electrode.

In exemplary embodiments, the cell voltage may be increased by increasing the capacitance of the "cell voltage limiting electrode", while maintaining the capacitance of the other electrode (i.e. the other electrode capacitance may be fixed). For example, referring again to Equations (1) to (4) above, the following equation can be derived:

$$E = \frac{CU^2}{2} = \frac{1}{2} C_P U_P^2 (1 + C_P/C_N) \qquad (5)$$

Therefore, Equations (2), (4) and (5) show that if the positive electrode of given values of $C_P$ and $U_P$ is limiting the cell voltage (i.e. $U°_P<U°_N$), the cell capacitance of an asymmetrical SP decreases with increasing $C_P/C_N$. However, the working potential range of the negative electrode, $U_N$, the cell voltage, U, and the energy (storage) capacity, E, will all increase linearly with $C_P/C_N$.

It is to be appreciated, however, that because Equation (2) is symmetrical to both the positive and negative electrodes, the other equations can be similarly rewritten with the negative electrode as the cell voltage limiting electrode (i.e. $U°_P>U°_N$).

The ratio of capacitances $C_P/C_N$ is preferably in the range of $1.0<C_P/C_N\leq1.5$, and in exemplary embodiments the ratio of capacitances $C_P/C_N$ is substantially 1.3.

However, it is to be appreciated that any ratio of capacitance greater than 1 may be used in conjunction with the present invention, depending on the particular device, application and electrode materials. In practice, of course, the actual range of unequalised capacitance will be limited by the degree of solvent decomposition and over-oxidation/reduction of the electrode materials.

The positive electrode may be fabricated from a conducting polymer. However, in exemplary embodiments, the positive electrode may be fabricated from a composite of a conducting polymer, most preferably polyaniline (PAN), and preferably carbon nanotubes (CNT), with the resulting nanocomposite material being known as a PAN-CNT.

The negative electrode is preferably fabricated from carbon, and most is preferably prepared from a mixture of Cabot Monarch 1300 pigment black (CMPB) and PTFE, which may be deposited onto a graphite disc.

An electrolyte is preferably disposed between the positive and negative electrodes, and may be an acidic aqueous electrolyte (e.g. 1.0 mol $L^{-1}$ HCl).

However, it is to be appreciated that any suitable electrode material and/or electrolyte may be used in conjunction with the present invention depending on the particular application and desired energy capacity characteristics and performance.

The present invention is also directed to an electrical apparatus comprising at least one charge storage device according to any of the preceding embodiments, with the device being operable to provide electrical energy to the apparatus.

According to a second aspect of the present invention there is provided a method of manufacturing a charge storage device, comprising:
providing a pair of charge storing electrodes;
and configuring the electrodes so that the respective capacitances $C_P$, $C_N$ of the electrodes are different to each other, with the ratio of the capacitances $C_P/C_N$ being greater than 1.

The electrodes may be fabricated from the materials as described above in relation to any of the preceding embodiments.

The method may further comprise disposing an electrolyte between the pair of electrodes. The electrolyte may be an acidic aqueous electrolyte (e.g. 1.0 mol $L^{-1}$ HCl).

It is to be understood that none of the preceding aspects and/or embodiments are intended to be mutually exclusive, and therefore features described in relation to any particular embodiment may be used additionally and/or interchangeably with features described in relation to any other embodiment without limitation.

Embodiments of the present invention will now be described in detail by way of example and with reference to the accompanying drawings in which:

FIG. 1 shows example scanning electron microscope images of (a) CMPB and (b) PAN-CNT, and (c) their cyclic voltammograms (CVs) in different potential ranges, i.e. CMPB: −0.5~0.5 V (thick dashed line) and −0.7~0.8 V (thin dashed line); PAN-CNT: 0~0.7 V (thick solid line) and 0.05~0.8 V (thin solid line). (CMPB: 0.3 mg; PAN-CNT: 208 mC of deposition charge) in 1 mol $L^{-1}$ HCl (aqueous). Scan rate: 50 mV $s^{-1}$;

Figure 1:
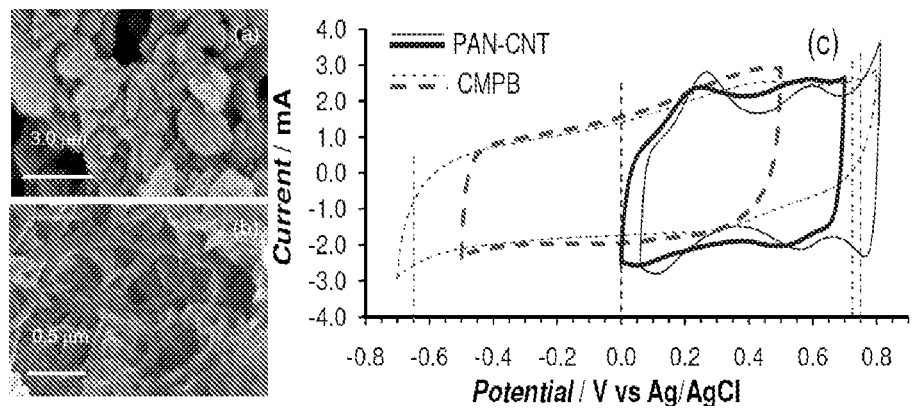

Referring to FIG. 1, there is shown results of experimental data to assess the cell voltage limiting electrode and what effect this has on the energy capacity of a conventional Supercapacitor. The data is derived from electrodes based on conducting polymers, which are commonly used in Supercapacitors due to their large pseudocapacitance, and relatively low cost. When combined with carbon nanotubes (CNTs) at the nanoscale, conducting polymers exhibit many improved properties, including electrode capacitance, exploitable potential range and cycle stability. A special case is polyaniline (PAN) which has very high theoretical specific capacitance (750 F/g) and excellent charging-discharging cycle stability. However, PAN has a small exploitable potential range of 0.7~0.8 V in acidic aqueous electrolytes. As a result, the energy capacity and power capability of PAN based symmetrical SPs are inhibited, as indicated by Equation (1), despite the polymer's ultra high specific capacitance. By electro-co-deposition of PAN and CNTs into nanocomposites (PAN-CNT), the charge-discharge capacity and rate are found to be improved, but there is little effect on the working potential range.

It is commonly perceived that asymmetrical SPs should have greater cell voltages than symmetrical SPs. However, as discussed below, this may not always be the case. To test this assertion, a graphite rod (6.0 mm diameter) sheathed in epoxy resin was ground and polished to expose the end face (disc) and served as the current collector and substrate for loading the active material.

The negative electrode was prepared by casting 30 μL of aqueous suspension of 0.3 mg Cabot Monarch 1300 pigment black (CMPB) and 40 μg of PTFE onto the graphite disc, and then drying in air. The PAN-CNT positive electrode was prepared by electro-co-deposition at a constant potential of 0.9 V vs. Ag/AgCl (3 mol L $KCl^{-1}$). Scanning Electron Microscope (SEM) images taken of the nano-structured CMPB (agglomerated ca. 10 nm particles) and PAN-CNT (network of nano-fibrils) electrodes are shown in parts (a) & (b) of FIG. 1, respectively.

Part (c) of FIG. 1 compares the cyclic voltammograms (CVs) of the two electrodes in different potential ranges. Near the ends of the wider potential ranges, the CVs reveal unwanted reactions in the aqueous HCl solution. The CMPB electrode, like other carbon electrodes, exhibits a high over-potential for the reduction of the H⁺ ion, pushing the potential to be more negative than <−0.65 V. Near the positive potential end (>0.72 V), the oxidation of $H_2O$ occurs in accordance with the standard electrode potential for $H_2O$ oxidation being 0.13 V less positive than that for Cl⁻ oxidation.

The very nearly 'rectangular' CVs in the narrower potential ranges in part (c) of FIG. 1 can be used to derive the capacitance: C=I/v, where I is the current and v the potential scan rate. Values of the electrode and specific capacitance of CMPB were found to be 34.2 mF and 114 F g⁻¹. For PAN-CNT, the capacitance is proportional to the deposition charge $Q_{dep}$ with $C/Q_{dep}$=0.164 F C⁻¹. Thus, to achieve the same capacitance as the negative electrode, i.e. 34.2 mF, the deposition charge was 208 mC.

As expected, the CVs in part (c) of FIG. 1 indicate that the CMPB and the PAN-CNTs electrodes are similar in capacitance. Part (c) also indicates two fairly different potential ranges for the two electrodes to remain capacitive (i.e. −0.65 to 0.72 V or $U°_N$=1.37 V for CMPB, and 0 to 0.75 V or $U°_P$=0.75 V for PAN-CNT). However, these two potential ranges overlap between 0 and 0.72 V, suggesting the possibility of construction of an asymmetrical SP with extended cell voltages to 1.4 V (−0.65 to 0.75 V) or higher. However, as will be described below, this increased cell voltage may only be achieved through unequalising the electrode capacitance by increasing the $C_P/C_N$ ratio, as prescribed in accordance with the present invention.

The above mentioned positive and negative electrodes of equal capacitance were tested in a laboratory SP with aqueous HCl (1.0 mol L⁻¹) as the electrolyte. Three different voltage ranges were applied in the tests and the CVs are shown in Part (a) of FIG. 2. It is evident that between 0 and 1.0 V (i.e. U=1.0 V), the CV is substantially rectangular in shape without any sign of irreversible reactions. However, when the cell voltage is increased, a small peak appears at ca. 1.15 V on the charging current. Further raising the voltage to 1.4 V, both the charging and discharging currents on the CV loose the capacitive feature of fast switching, joining into a tail at the high voltage end. The small charging peak at ca. 1.15 V in Part (a) of FIG. 2 may be attributed to the over-oxidation of PAN to nigraniline or pernigraniline, which is non-capacitive and much less conducting. To prove this assumption, the PAN-CNT electrode was examined in a three-electrode cell both before and after voltage cycling (0 to 1.4 V) in the two-electrode asymmetrical SP. As presented in Part (b) of FIG. 2, the CV of freshly electro-deposited PAN-CNT consists mainly of emeraldine. At this oxidation level, PAN is characterised by three pairs of redox peaks (cf. dashed line), reflecting the transition between different oxidation states of PAN at different potentials or doping levels. However, after the voltage cycling in Part (a) of FIG. 2, peaks a3 and c3 diminish drastically. Also, peaks a1 and c1 became attenuated whilst a2 and c2 are strengthened.

Figure 2:
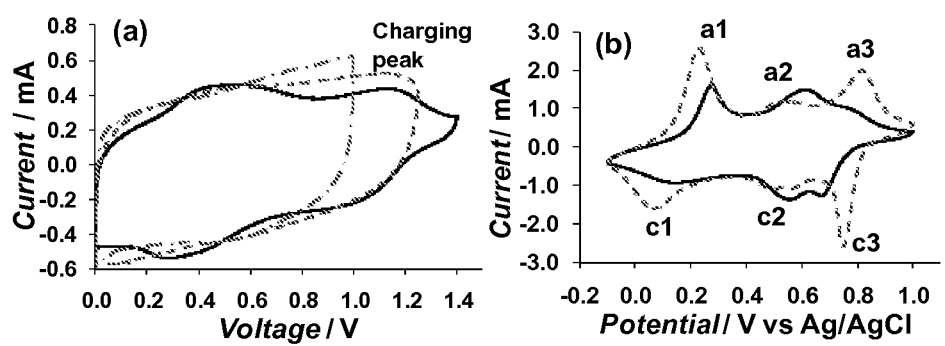
FIG. 2 shows example CVs of (a) asymmetrical SP with a PAN-CNT ($Q_{dep}$: 208 mC) positive electrode and a CMPB (0.3 mg) negative electrode, and (b) PAN-CNT freshly prepared (dashed line), and after potendiodynamic cycles as shown in (a) (solid line). Scan rate: 20 mV $s^{-1}$.

These changes in peak intensity are caused by PAN being over-oxidised to nigraniline or pernigraniline when the asymmetrical SP was charged to too high cell voltages as shown in Part (a) of FIG. 2. The two differently shaped CVs of the freshly prepared and over-oxidised PAN have been observed previously, which proves the assumption that the charging peak at ca. 1.15 V in Part (a) of FIG. 2 is indeed due to over-oxidation of the positive electrode. Thus, in the asymmetrical SP of PAN-CNT (+)|HCl (1.0 mol L⁻¹)|CMPB (−), the positive electrode is the "cell voltage limiting electrode".

Hence, in accordance with embodiments of the present invention, we have found that the voltage of an asymmetrical SP can be advantageously extended by increasing the capacitance of the "cell voltage limiting electrode" with the other electrode being fixed in capacitance. In one example, several PAN-CNT positive electrodes were prepared at deposition charges of 166 to 312 mC, corresponding to $C_P/C_N$ ratios of 0.8 to 1.5. The CVs of these PAN-CNT (+)|HCl (1.0 mol L⁻¹)|CMPB (−) asymmetrical SPs are shown in Part (a) of FIG. 3. Charging peaks can be identified on all these CVs near the high voltage end, but the peak voltage shifts to higher values with increasing the $C_P/C_N$ ratio. This change is not only indicative of the over-oxidation of PAN being pushed to higher potentials, but also allows estimation of the potentials of the two electrodes.

Figures 3, 4:
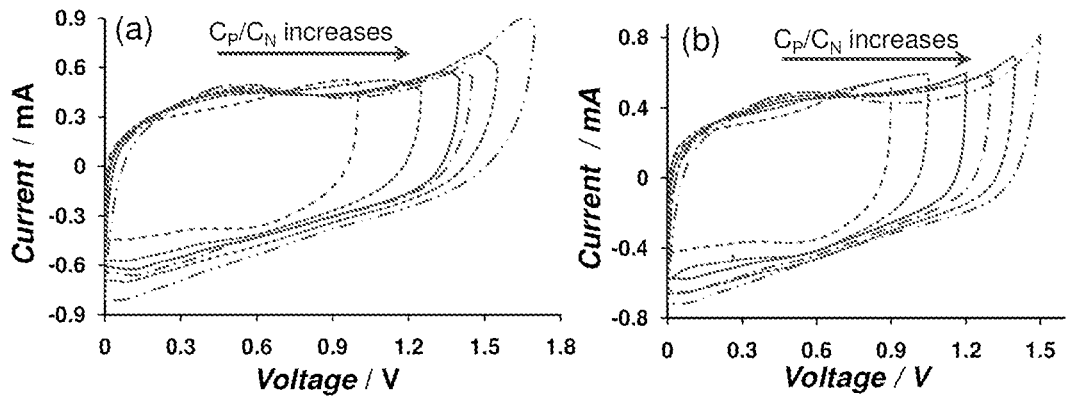
FIG. 3 shows example CVs of asymmetrical SPs according to the present invention with a 0.3 mg CMPB negative electrode and a PAN-CNT positive electrode at various $C_P/C_N$ ratios (see FIG. 4), with (a) and without (b) the charging current peak. Scan rate: 20 mV $s^{-1}$.
FIG. 4 is in the form of a table illustrating a performance comparison between example asymmetrical SPs with PAN-CNT composite positive electrode and CMPB negative electrode (data are derived from CVs in FIGS. 2 & 3) according to the present invention.

For example, Part (a) of FIG. 3 shows that, at $C_P/C_N$=1.3, the charging peak occurs at the cell voltage of $U_{Peak}$=1.47 V (see table in FIG. 4), at which the potential of the PAN-CNT electrode, $E_P$, should be 0.78 V vs. Ag/AgCl for peak a3 in Part (b) of FIG. 2. Thus, the corresponding potential of the CMPB electrode is $E_N$=0.69 V vs. Ag/AgCl. Assuming the potential of both positive and negative electrodes to be $E_0$ vs. Ag/AgCl when the cell is fully discharged, i.e. U=0, and also bearing in mind that $U_P$=$E_P$−$E_0$ and $U_N$=$E_0$−$E_N$ by definition, it can be calculated from Equation (2) that $E_0$=0.14 V.

The $E_N$ and $E_0$ values for other $C_P/C_N$ ratios are listed in the table of FIG. 4. It is worth noting that although $U_{Peak}$ increases with the $C_P/C_N$ ratio as shown in Part (a) of FIG. 3, the positive electrode experiences the same reaction as indicated by peak a3 in Part (b) of FIG. 2. Accordingly, $E_P$=constant=0.78 V vs. Ag/AgCl.

To further show the effect of the $C_P/C_N$ ratio on the performance of the asymmetrical SPs, CVs are shown in Part (a) of FIG. 3 which have been recorded between 0 and a selected voltage where the charging peak is just about to emerge. This is to ensure insignificant over-oxidation of PAN. The resulting CVs exhibit very capacitive features at $C_P/C_N$ ratios of 0.8 to 1.3. Note that at $C_P/C_N$=1.3, the cell voltage already reaches 1.4 V as derived from Part (c) of FIG. 1. When the $C_P/C_N$ ratio reaches 1.5, however, extending the cell voltage to 1.5 V leads to a significant increase in the charging current starting from about 1.4 V. Also, the switching at the high voltage end (1.5 V) becomes tilted, indicating non-capacitive contribution. These changes may be caused by the high voltage triggering off the over-oxidation of PAN, although the charging peak does not yet appear.

The table in FIG. 4, lists the performance parameters of the PAN-CNT (+)|HCl (1.0 mol L⁻¹)|CMPB (−) asymmetrical SPs as derived from the CVs in Part (b) of FIG. 3. The data shows a substantial increase (0.9 to 1.4 V) in the voltage of the asymmetrical cells with $C_P/C_N$ increasing from 0.8 to 1.3. The capacitance values in the table are calculated according to C=$Q_{cv}$/U, where $Q_{cv}$ is the average value of positive and negative charges of the CV. The mass, m, is the sum of the CMPB (0.3 mg) and the PAN-CNT composite. The latter has been calculated from the correlation between the mass and deposition charge (ca. 0.50 mg C⁻¹).

The specific energy and power, $E_m$ and $P_m$, of the asymmetrical SPs are calculated according to $E_m$=CU²/2m, $P_m$=$E_m$/t, and t=U/v. Therefore, as shown in FIG. 4, changing the $C_P/C_N$ ratio from 1.0 to 1.3 increases the specific energy by 72.6% and the specific power by 29.3%. These improvements are quite significant, as there was only a small increase of 7.7% in the total mass of the electrode materials.

Figure 5:
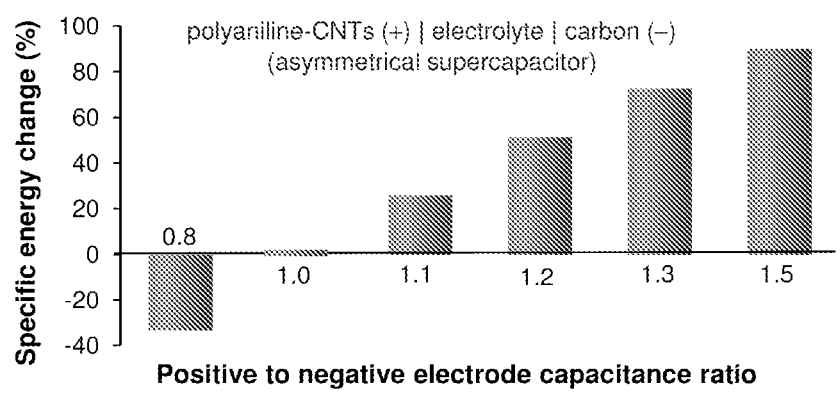
FIG. 5 shows the percentage specific energy change as a function of changing $C_P/C_N$ ratio for an example asymmetrical SP with a PAN-CNT according to an embodiment of the present invention.

Hence, the present invention provides an effective technique to extend the cell voltage of asymmetrical Supercapacitors. Thus, by increasing the relative capacitance of the "cell voltage limiting electrode", the energy capacity and power capability of asymmetrical Supercapacitors can be significantly enhanced. Therefore, as illustrated in FIG. 5, there is a considerable change in energy capacity of the SP with increasing $C_P/C_N$ ratio, which has hitherto not been recognised in the prior art.

Although the present invention is ideally suited for fabricating asymmetrical supercapacitors having enhanced energy capacity and power capability, it will be recognised that one or more of the principles of the invention may also extend to other asymmetrical electrochemical devices, such as fuel cells and batteries etc., whereby in addition to increased energy capacity, a low cost design and economical manufacturing strategy is also desired.

The above embodiments are described by way of example only. Many variations are possible without departing from the invention.

The invention claimed is:

1. An asymmetrical supercapacitor, comprising:
   a pair of electrodes, one being a positive electrode in the form of a nanocomposite of a conductive polymer and the other a negative electrode in the form of a carbon electrode, each electrode being operable to store electric charge and having a respective capacitance $C_p$, $C_N$ that is different to the other, with the ratio of the capacitances $C_p/C_N$ being greater than 1;
   wherein the supercapacitor has a charging characteristic that is dependent on the operating voltage U applied to at least one of the electrodes, such that the peak voltage $U_{peak}$ is determined by the ratio of the capacitances $C_p/C_N$, with the potential of the positive electrode maintaining a constant peak voltage $E_p$ below the peak voltage $U_{peak}$ with increasing ratio of capacitances $C_p/C_N$, until the onset of oxidation of the positive electrode.

2. The supercapacitor of claim 1, wherein the charging characteristic is a current-voltage curve.

3. The supercapacitor of claim 1, wherein the capacitance of one of the electrodes is fixed.

4. The supercapacitor of claim 1, wherein the peak voltage $U_{peak}$ increases as the ratio of capacitances $C_p/C_N$ increases.

5. The supercapacitor of claim 1, wherein the ratio of capacitances $C_{p/CN}$ is in the range of $1.0<C_p/C_N\leq 1.5$.

6. The supercapacitor of claim 5, wherein the ratio of capacitances $C_p/C_N$ is 1.3.

7. The supercapacitor of claim 1, wherein increasing the ratio of the capacitances $C_p/C_N$ extends the operating voltage U of the supercapacitor.

8. The supercapacitor of claim 1, further comprising an electrolyte disposed between the positive and negative electrodes.

9. The supercapacitor of claim 1, wherein the positive electrode comprises a composite of carbon nanotubes and polyaniline.

10. The supercapacitor of claim 1, wherein the negative electrode comprises Cabot Monarch pigment black.

11. A method of manufacturing an asymmetrical supercapacitor, the method comprising:
    preparing a positive electrode by electro-co-deposition of a conducting polymer and carbon nanotubes;
    preparing a negative electrode via aqueous carbon deposition; and
    selecting the electrical properties of at least the positive electrode by varying the applied potential during deposition, such that the supercapacitor adopts a charging characteristic that is dependent on the operating voltage U applied to at least one of the electrodes, with the peak voltage $U_{peak}$ being determined by the ratio of the capacitances $C_p/C_N$ and the potential of the positive electrode maintaining a constant peak voltage $E_p$ below the peak voltage $U_{peak}$ with increasing ratio of capacitances $C_p/C_N$, until the onset of oxidation of the positive electrode.

* * * * *